United States Patent
Oda

(10) Patent No.: US 9,792,495 B2
(45) Date of Patent: Oct. 17, 2017

(54) CHARACTER RECOGNITION APPARATUS, CHARACTER RECOGNITION PROCESSING SYSTEM, AND NON-TRANSITORY COMPUTER READABLE MEDIUM

(71) Applicant: FUJI XEROX CO., LTD., Tokyo (JP)

(72) Inventor: Hideto Oda, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 40 days.

(21) Appl. No.: 14/878,386

(22) Filed: Oct. 8, 2015

(65) Prior Publication Data

US 2016/0292499 A1 Oct. 6, 2016

(30) Foreign Application Priority Data

Apr. 3, 2015 (JP) ................................. 2015-076495

(51) Int. Cl.
*G06K 9/40* (2006.01)
*G06K 9/00* (2006.01)
*G06K 9/22* (2006.01)

(52) U.S. Cl.
CPC ..... *G06K 9/00416* (2013.01); *G06K 9/00422* (2013.01); *G06K 9/222* (2013.01); *G06K 2209/01* (2013.01)

(58) Field of Classification Search
CPC   G06K 9/00422; G06K 9/222; G06F 3/04883; G06F 3/03545; G06F 17/243
USPC ....... 382/181, 187, 190, 195, 198, 199, 173, 382/201, 224, 266, 276, 290, 275
See application file for complete search history.

(56) References Cited

U.S. PATENT DOCUMENTS

| | | | | |
|---|---|---|---|---|
| 6,226,403 | B1* | 5/2001 | Parthasarathy | G06K 9/4604 345/171 |
| 6,519,363 | B1* | 2/2003 | Su | G06K 9/68 382/177 |
| 7,142,715 | B2* | 11/2006 | Fahmy | G06K 9/222 382/187 |
| 7,502,017 | B1* | 3/2009 | Ratzlaff | G06F 3/04883 345/173 |
| 8,009,915 | B2* | 8/2011 | Predovic | G06K 9/00422 382/119 |
| 8,208,736 | B2* | 6/2012 | Meyer | G06K 9/72 382/209 |

(Continued)

FOREIGN PATENT DOCUMENTS

| | | |
|---|---|---|
| JP | 06-052363 A | 2/1994 |
| JP | 07-049926 A | 2/1995 |

*Primary Examiner* — Sheela C Chawan
(74) *Attorney, Agent, or Firm* — Sughrue Mion, PLLC

(57) ABSTRACT

A character recognition apparatus includes a stroke extracting unit, a noise-candidate extracting unit, a generating unit, a unit, and a specifying unit. The stroke extracting unit extracts multiple strokes from a recognition target. The noise-candidate extracting unit extracts noise candidates from the strokes. The generating unit generates multiple recognition result candidates obtained by removing at least one of the noise candidates from the recognition target. The unit performs character recognition on the recognition result candidates and obtains recognition scores. The specifying unit uses the recognition scores to specify a most likely recognition result candidate from the recognition result candidates as a recognition result.

12 Claims, 10 Drawing Sheets

(56) References Cited

U.S. PATENT DOCUMENTS 8,542,927 B2 * 9/2013 Liu ..................... G06F 3/018
  345/179

* cited by examiner

FIG. 7

200 → 123.456, 123.456.
SCORE = 0.219109878

301 → 123 45 6 123456.
SCORE = 0.1825421

302 → 123.45 6, 123.436.
SCORE = 0.245170683

303 → 123.45 6 123.456
SCORE = 0.882650554

311 → 123 45 6, 123436.
SCORE = 0.225973964

312 → 123 45 6 123456
SCORE = 0.8833915

313 → 123.45 6 123.436
SCORE = 0.626332343

321 → 123 45 6 123436
SCORE = 0.7388184

FIG. 9A
RELATED ART
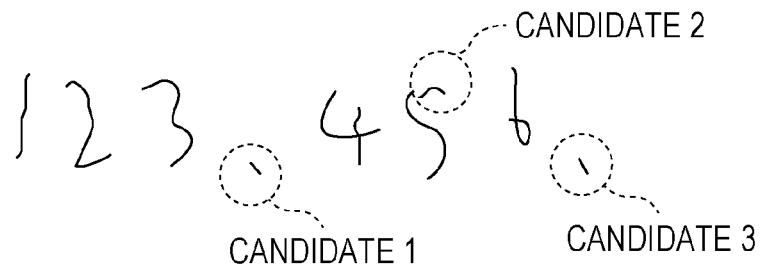
FIG. 9B
RELATED ART
| NOISE | EVALUATION VALUE |
|---|---|
| CANDIDATE 1 | 9 |
| CANDIDATE 3 | 8 |
| CANDIDATE 2 | 2 |
↑ REMOVE
FIG. 9C
RELATED ART
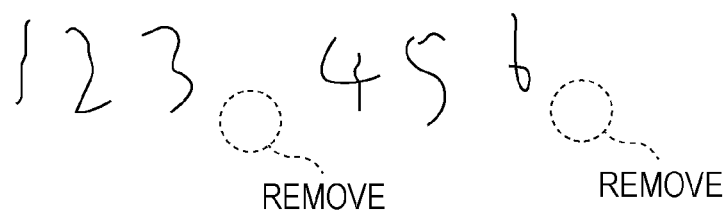

US 9,792,495 B2

CHARACTER RECOGNITION APPARATUS, CHARACTER RECOGNITION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-076495 filed Apr. 3, 2015.

BACKGROUND

The present invention relates to a character recognition apparatus, a character recognition processing system, and a non-transitory computer readable medium.

SUMMARY

According to an aspect of the invention, there is provided a character recognition apparatus including a stroke extracting unit, a noise-candidate extracting unit, a generating unit, a unit, and a specifying unit. The stroke extracting unit extracts multiple strokes from a recognition target. The noise-candidate extracting unit extracts noise candidates from the strokes. The generating unit generates multiple recognition result candidates obtained by removing at least one of the noise candidates from the recognition target. The unit performs character recognition on the recognition result candidates and obtains recognition scores. The specifying unit uses the recognition scores to specify a most likely recognition result candidate from the recognition result candidates as a recognition result.

BRIEF DESCRIPTION OF THE DRAWINGS

Exemplary embodiment of the present invention will be described in detail based on the following figures, wherein:

FIG. 7 is a diagram illustrating recognition results and recognition scores (scores) which are obtained by a character recognition processor;

FIGS. 9A to 9C are diagrams for describing a problem of the related art in that a stroke to be recognized as a character is removed as noise.

DETAILED DESCRIPTION

Referring to the attached drawings, an exemplary embodiment of the present invention will be described below in detail.

Description of a Problem of the Related Art which Leads to the Exemplary Embodiment Before describing specifics of the exemplary embodiment, a problem of the related art which leads to the exemplary embodiment will be described.

FIGS. 9A to 9C are diagrams for describing a problem of the related art in that a stroke to be recognized as a character is removed as noise. FIG. 9A illustrates a recognition target; FIG. 9B illustrates an example of noise candidates and evaluation values; and FIG. 9C illustrates a result in which noise is removed.

In the recognition target illustrated in FIG. 9A, three noise stroke candidates, candidates 1 to 3, are extracted. For these noise stroke candidates, evaluation values are determined in consideration of the character size or the stroke size, the distance between strokes, and the like. In the example illustrated in FIG. 9B, the noise stroke candidates are arranged in descending order of the evaluation value. The evaluation value of the candidate 1 in the noise stroke candidates is 9; the evaluation value of the candidate 3 in the noise stroke candidates is 8; and the evaluation value of the candidate 2 in the noise stroke candidates is 2. When noise stroke candidates are removed from the recognition target in descending order of the evaluation value indicating a probability of noise, the noise stroke candidates of the candidate 1 and the candidate 3 are removed in the example illustrated in FIG. 9B. That is, a noise stroke is not geometrically distinguished from a non-noise stroke. In an environment in which it is difficult to rank the strokes using evaluation values for noise, a necessary stroke may be removed. As a result, as illustrated in FIG. 9C, even a necessary decimal point is removed.

A character recognition apparatus to which the exemplary embodiment is applied does not use evaluation values for noise itself, and accurately removes only noise in a state in which noise strokes and non-noise strokes are present in a coexistent manner.

Overall Configuration of Character Recognition Processing System 100

Figure 1:
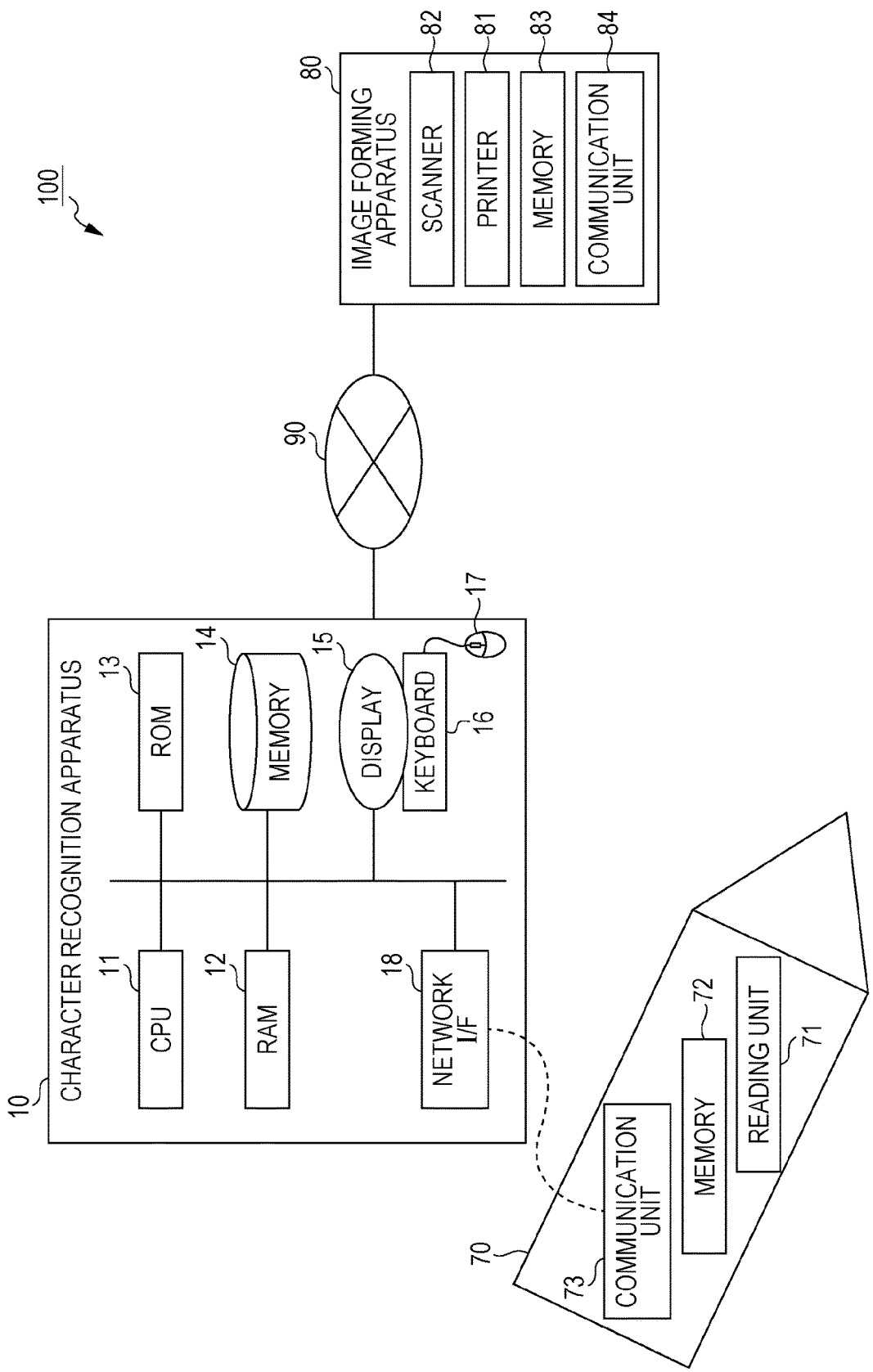
FIG. 1 is a schematic diagram illustrating the overall configuration of a character recognition processing system to which the present exemplary embodiment is applied.

FIG. 1 is a schematic diagram illustrating the overall configuration of a character recognition processing system 100 to which the exemplary embodiment is applied. The character recognition processing system 100 includes a character recognition apparatus 10, a pen-type device 70 which inputs information such as handwritten characters to the character recognition apparatus 10, and an image forming apparatus 80 which is connected via a network 90 such as a local area network (LAN) to the character recognition apparatus 10 and which, for example, outputs an image.

The character recognition apparatus 10 performs online handwritten character recognition and offline character recognition. The online handwritten character recognition is a technique in which handwriting of characters which are input by using a tablet, an electronic pen (pen-type device 70), or the like is converted into electronic text. The offline handwritten character recognition is a technique in which a handwritten character image or a typed character image is converted into text, the image being obtained by scanning, for example, by using a scanner 82 or the like which is described below.

The character recognition apparatus 10 is constituted, for example, by a personal computer (PC), and is provided with various functions included in a typical personal computer. More specifically, the character recognition apparatus 10 includes a central processing unit (CPU) 11 which executes various types of software, such as an operating system (OS) and applications, and which performs various functions described below, a random-access memory (RAM) 12 used as a work memory for the CPU 11, and a read-only memory (ROM) 13 which is a memory in which various programs executed by the CPU 11 are stored. The RAM 12 may function as a primary storage area, for example, for information which is input from the pen-type device 70. The character recognition apparatus 10 also includes a memory 14 which is used to store various types of image information, recognition results, and the like and which is constituted by a magnetic disk or the like. The character recognition apparatus 10 further includes a display 15 such as a liquid-crystal display which is a recognition-result output unit, a keyboard 16 serving as an input unit, and a pointing device 17 serving as an auxiliary input unit. The character recognition apparatus 10 furthermore includes a network interface 18 which receives/transmits various types of information from/to the pen-type device 70 and the image forming apparatus 80. The network interface 18 obtains information such as handwritten characters from the pen-type device 70, for example, through wireless communication. Information may be obtained from the pen-type device 70 through a connector based on the Universal Serial Bus (USB) standard, or through the network 90.

The pen-type device 70 serving as an exemplary user-writing-information acquiring device is a writing device for writing characters and figures by using ink or the like on paper on which an image is formed, for example, by using the image forming apparatus 80. The pen-type device 70 functions as an electronic pen, and includes a reading unit 71 which reads information recorded on paper, a memory 72 which is used to store the read information, and a communication unit 73 which performs communication with the character recognition apparatus 10, such as transmission of the stored information to the character recognition apparatus 10. The pen-type device 70 is pressed against a predetermined sheet of paper and is moved, whereby characters are input. For example, the predetermined sheet of paper contains micro-bar codes which are uniformly printed on the writing paper surface. The micro-bar codes have position information with which the position of the pen-type device 70 is uniquely determined on the writing paper surface. The pen-type device 70 is moved on the writing paper surface. The reading unit 71 reads the coordinates values obtained during movement, and stores the coordinates values as time-series data in the memory 72.

As other examples of a user-writing-information acquiring device, the scanner 82 provided for the image forming apparatus 80, and various input devices such as a tablet (not illustrated) connected to the network 90 may be employed.

The image forming apparatus 80 forms an image on a recording medium such as paper, and communicates with the character recognition apparatus 10 via the network 90, thereby forming an image on paper on the basis of information transmitted from the character recognition apparatus 10. The image forming apparatus 80 is provided, for example, with a function of reading and storing an image. More specifically, the image forming apparatus 80 includes a printer 81 which outputs, for example, a form image or the like for writing handwritten characters, the scanner 82 which reads, for example, a handwritten character image, a memory 83 which is used to store various types of image information, and a communication unit 84 which receives/transmits information from/to the character recognition apparatus 10 or the like via the network 90. The printer 81 may employ, for example, an electrophotographic system, or may employ another image forming system such as an inkjet system.

Description of Functions of Character Recognition Apparatus 10

Figure 2:
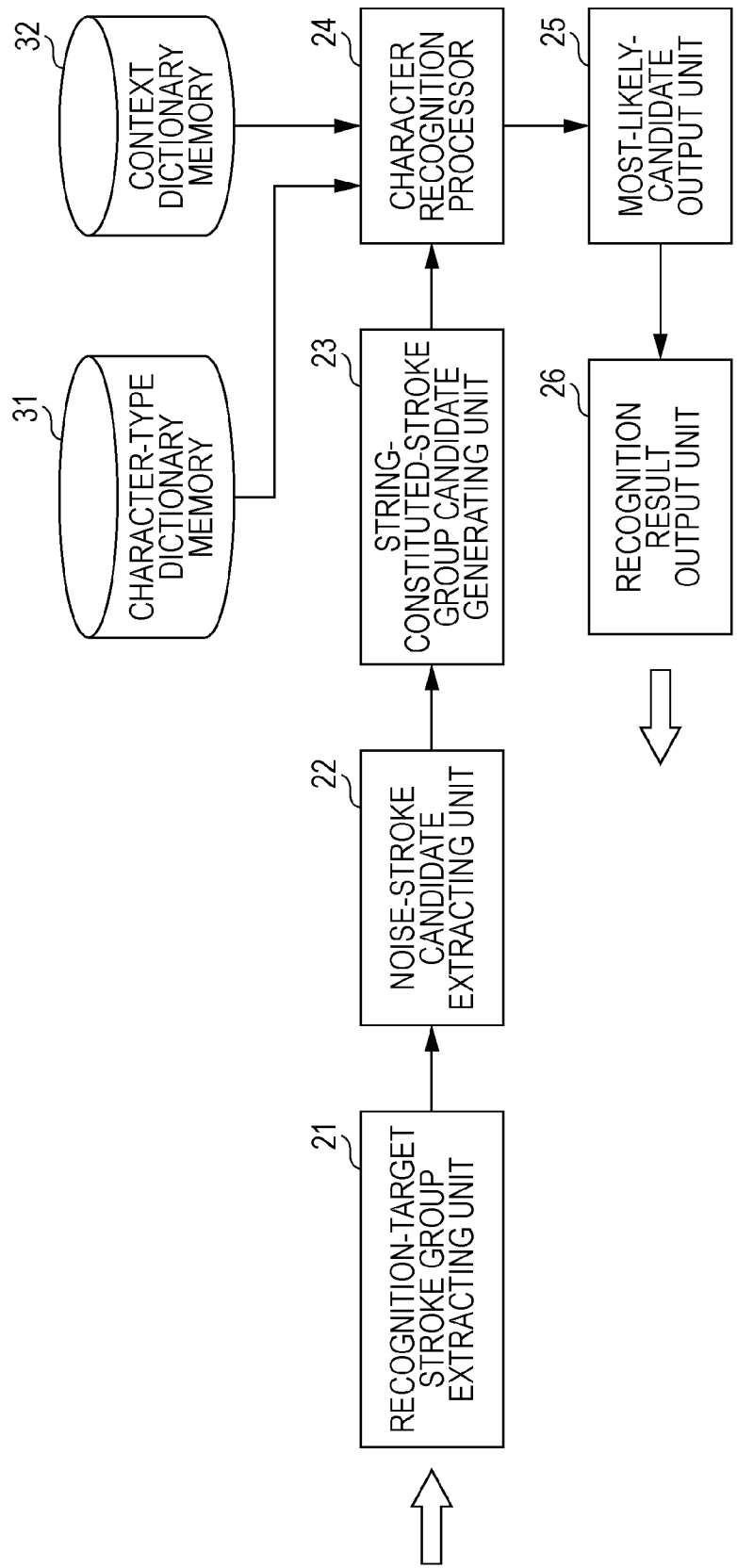
FIG. 2 is a block diagram illustrating the functional configuration of a character recognition apparatus.

FIG. 2 is a block diagram illustrating the functional configuration of the character recognition apparatus 10. As illustrated in FIG. 2, the character recognition apparatus 10 includes a recognition-target stroke group extracting unit 21, a noise-candidate extracting unit 22, and a string-constituting-stroke group candidate generating unit 23. The recognition-target stroke group extracting unit 21 serves as a stroke extracting unit which extracts a stroke group constituted by multiple strokes from a recognition target. The noise-stroke candidate extracting unit 22 serves as a noise-candidate extracting unit which extracts noise candidates from the multiple obtained strokes. The string-constituting-stroke group candidate generating unit 23 serves as a generating unit which removes one or more noise stroke candidates from the recognition-target stroke group and which generates string-constituting-stroke group candidates. The character recognition apparatus 10 also includes a character recognition processor 24 which uses a character-type dictionary stored in a character-type dictionary memory 31 and a context dictionary stored in a context dictionary memory 32 to perform character recognition and which obtains recognition scores, a most-likely-candidate output unit 25 serving as a specifying unit which selects the final result according to the magnitudes of the recognition scores and the like, and a recognition result output unit 26 which outputs the recognition result to the next recognition process and which also cause a user to recognize the result by, for example, displaying the recognition result on the display 15.

A recognition target which is a target for extraction performed by the recognition-target stroke group extracting unit 21 is obtained, for example, by using the pen-type device 70. Instead, a recognition target is read, for example, by using the scanner 82 included in the image forming apparatus 80, and is obtained through the network 90. Further, a recognition target stored in the memory 83 of the image forming apparatus 80 may be obtained through the network 90, or a recognition target may be obtained from another reading apparatus such as a tablet (not illustrated) connected to the network 90. Alternatively, simply, a recognition target may be obtained by reading a handwritten image stored in the memory 14 of the character recognition apparatus 10. An obtained recognition target is constituted by multiple strokes.

Flow of Extremely-Small-Stroke Deletion Process

Figure 3:
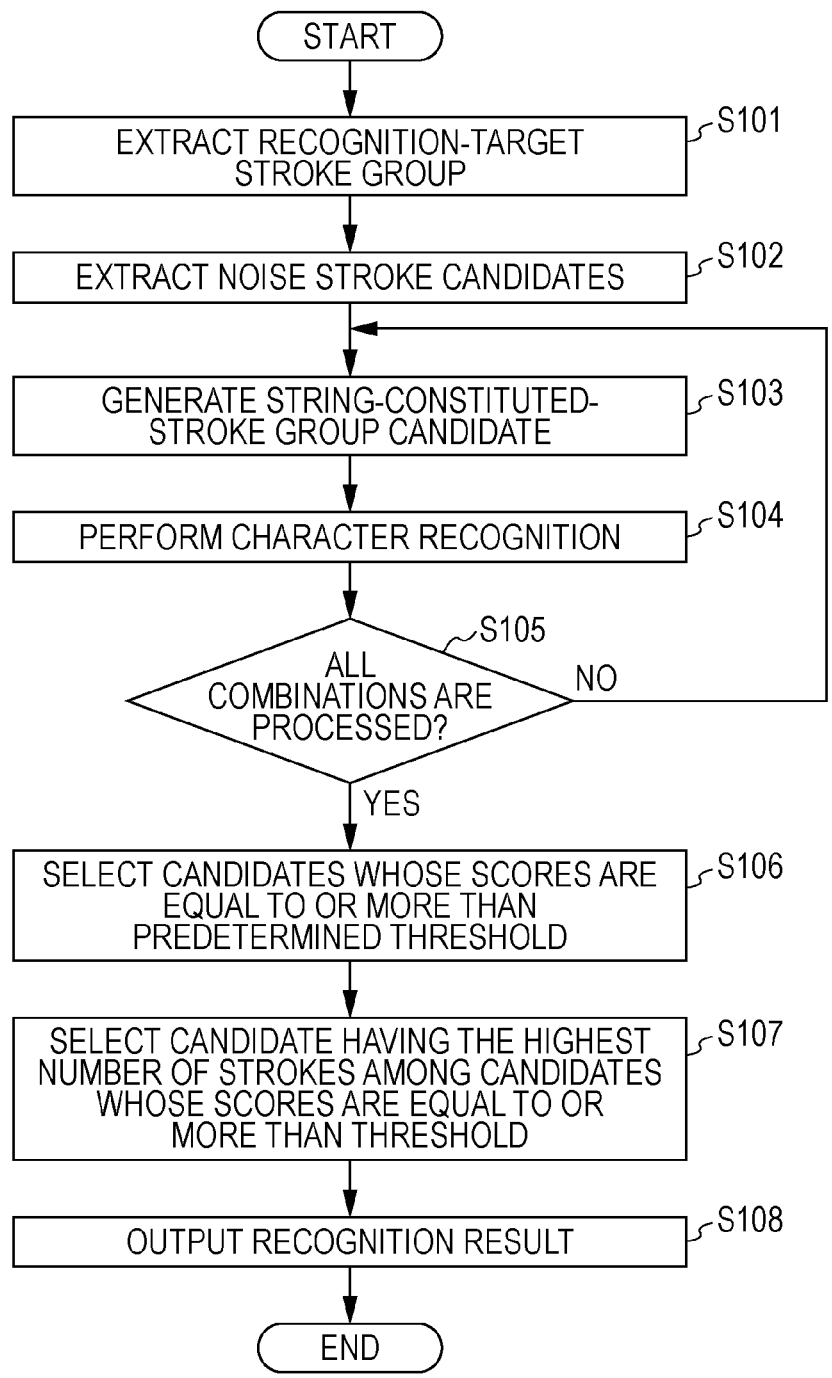
FIG. 3 is a flowchart illustrating the flow of an extremely-small-stroke deletion process performed by the character recognition apparatus.

FIG. 3 is a flowchart illustrating the flow of an extremely-small-stroke deletion process performed by the character recognition apparatus 10.

The recognition-target stroke group extracting unit 21 extracts a stroke group constituted by multiple strokes from a recognition target (step S101). The noise-stroke candidate extracting unit 22 extracts noise stroke candidates from the extracted stroke group (step S102).

Figure 4A:
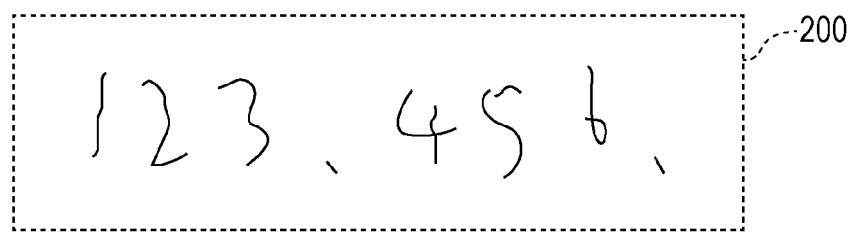
FIGS. 4A and 4B are diagrams for describing extraction of a recognition-target stroke group and extraction of noise stroke candidates.
Figure 4B:
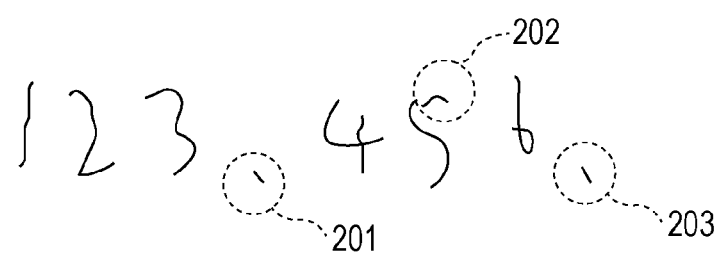

FIGS. 4A and 4B are diagrams for describing extraction of a recognition-target stroke group which is performed in step S101, and extraction of noise stroke candidates which is performed in step S102. FIG. 4A illustrates a recognition-target stroke group 200 which has been extracted, and FIG. 4B illustrates exemplary noise stroke candidates.

A stroke in the recognition target is data of a dot sequence obtained through sampling, for example, from a pen-down operation to a pen-up operation with the pen-type device 70. A stroke group is constituted by multiple strokes, each of which is the data of a dot sequence. The recognition-target stroke group 200 contains multiple pieces of data, each of which is a character constituted by one or more strokes or a stroke other than a character. The recognition-target stroke group 200 includes string-constituting strokes constituting characters, and noise strokes to be removed as noise. At the time point of extraction of the recognition-target stroke group at step S101, a string-constituting stroke and a noise stroke fail to be differentiated from each other. The noise-stroke candidate extracting unit 22 uses the length of a stroke, the size of the circumscribed rectangle, and the like to extract a noise stroke candidate. In FIG. 4B, a first noise stroke candidate 201, a second noise stroke candidate 202, and a third noise stroke candidate 203 are extracted.

An example of a method of extracting noise stroke candidates is a method in which, when the number of dots in the dot sequence constituting a stroke is equal to or less than a predetermined number, the stroke is determined to be a noise stroke candidate. Alternatively, for example, when the size of the circumscribed rectangle of a stroke is equal to or less than a predetermined size, the stroke is determined to be a noise stroke candidate. An extraction method may be selected from these extraction methods in accordance with a writing device or a writing environment. For example, in consideration of the characteristics of a device used to input a recognition target, such as the pen-type device 70 which is an electronic pen, a tablet, or a smartphone, the criterion may be determined.

Flow of Extremely-Small-Stroke Deletion Process—Process of Generating String-Constituting-Stroke Group Candidate After step S102 illustrated in FIG. 3, the string-constituting-stroke group candidate generating unit 23 removes one or more noise stroke candidates from the recognition-target stroke group 200, and generates a string-constituting-stroke group candidate (step S103). Depending on how to remove noise strokes, multiple string-constituting-stroke group candidates may be generated.

Figure 5:
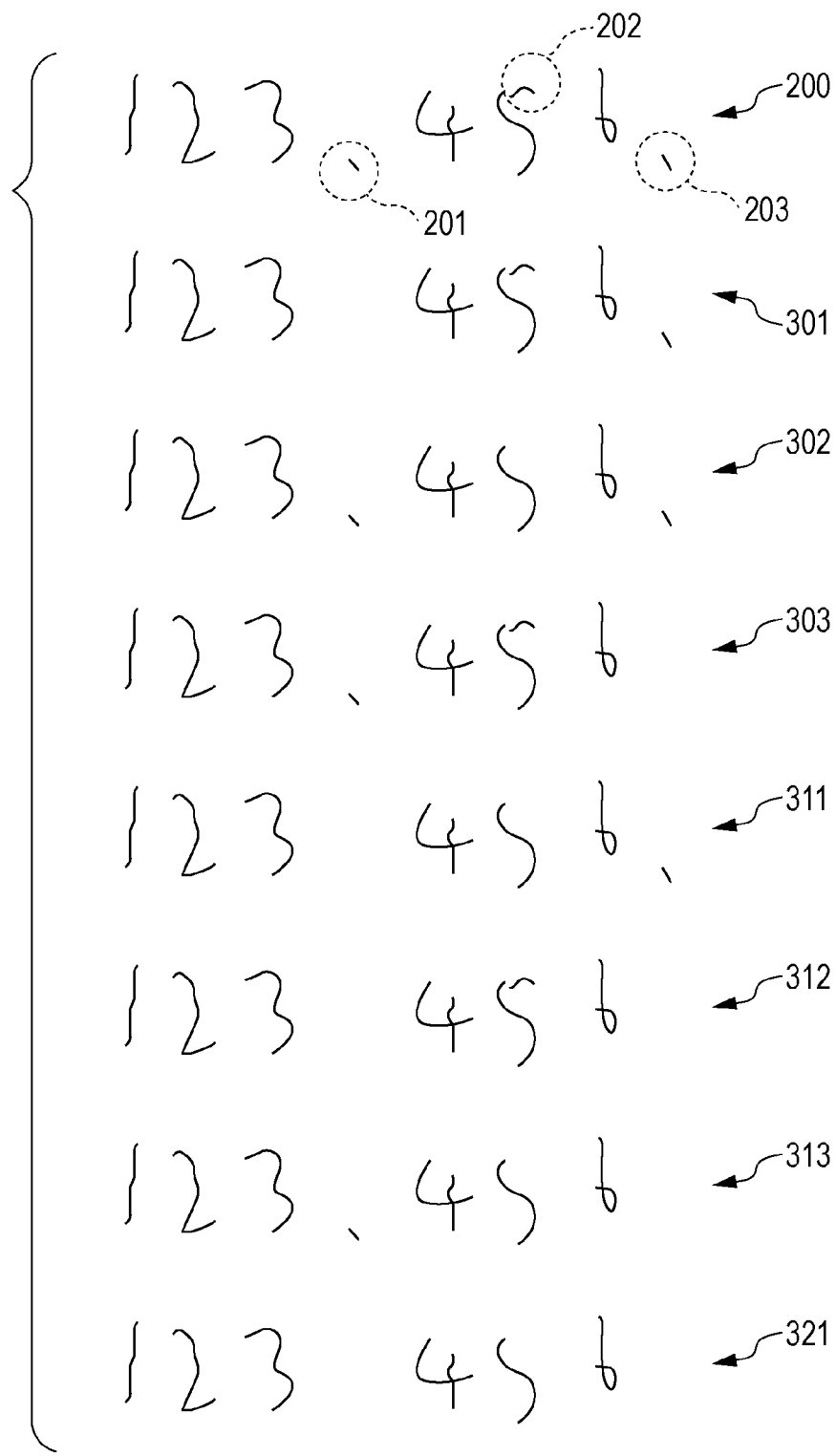
FIG. 5 is a diagram for describing a process of generating string-constituting-stroke group candidates.

FIG. 5 is a diagram for describing a process of generating string-constituting-stroke group candidates. FIG. 5 illustrates the recognition-target stroke group 200 from which noise strokes are not removed, string-constituting-stroke group candidates 301 to 303 from each of which one noise stroke is removed, string-constituting-stroke group candidates 311 to 313 from each of which two noise strokes are removed, and a string-constituting-stroke group candidate 321 from which three noise strokes are removed. More specifically, the string-constituting-stroke group candidate 301 is obtained by removing the first noise stroke candidate 201; the string-constituting-stroke group candidate 302 is obtained by removing the second noise stroke candidate 202; and the string-constituting-stroke group candidate 303 is obtained by removing the third noise stroke candidate 203. The string-constituting-stroke group candidate 311 is obtained by removing the first noise stroke candidate 201 and the second noise stroke candidate 202; the string-constituting-stroke group candidate 312 is obtained by removing the first noise stroke candidate 201 and the third noise stroke candidate 203; and the string-constituting-stroke group candidate 313 is obtained by removing the second noise stroke candidate 202 and the third noise stroke candidate 203. The string-constituting-stroke group candidate 321 is obtained by removing the first noise stroke candidate 201, the second noise stroke candidate 202, and the third noise stroke candidate 203.

To limit the number of string-constituting-stroke group candidates and reduce the processing time, a rule describing how to remove noise strokes may be determined. For example, the number of strokes to be removed is determined. For example, zero to one noise stroke is to be removed, or zero to two noise strokes are to be removed.

Figure 6A:
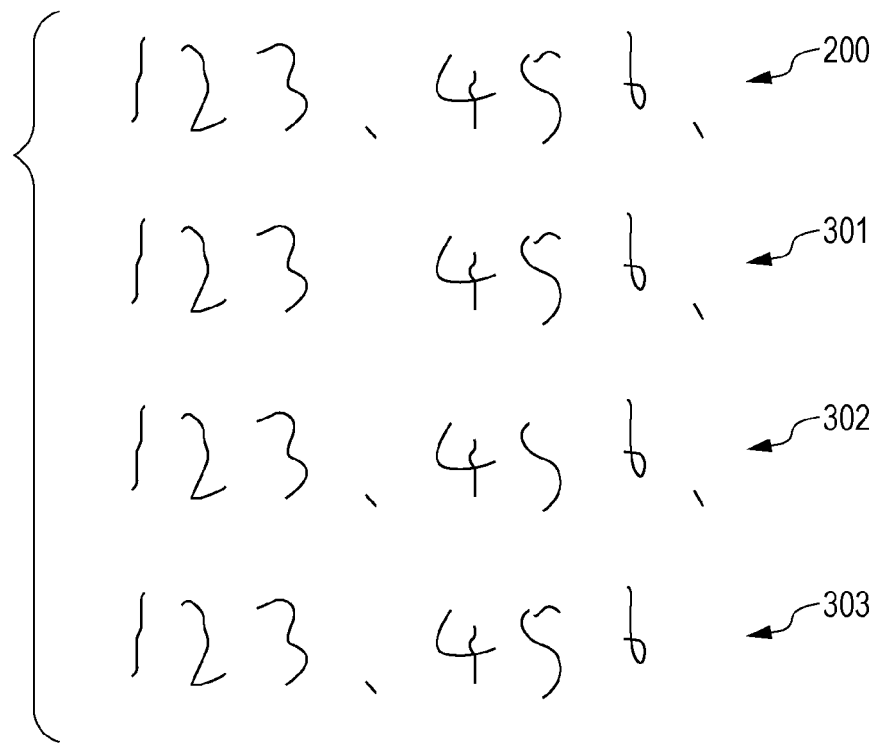
FIGS. 6A and 6B are diagrams illustrating examples in which string-constituting-stroke group candidates are generated by determining a rule for removing noise strokes.
Figure 6B:
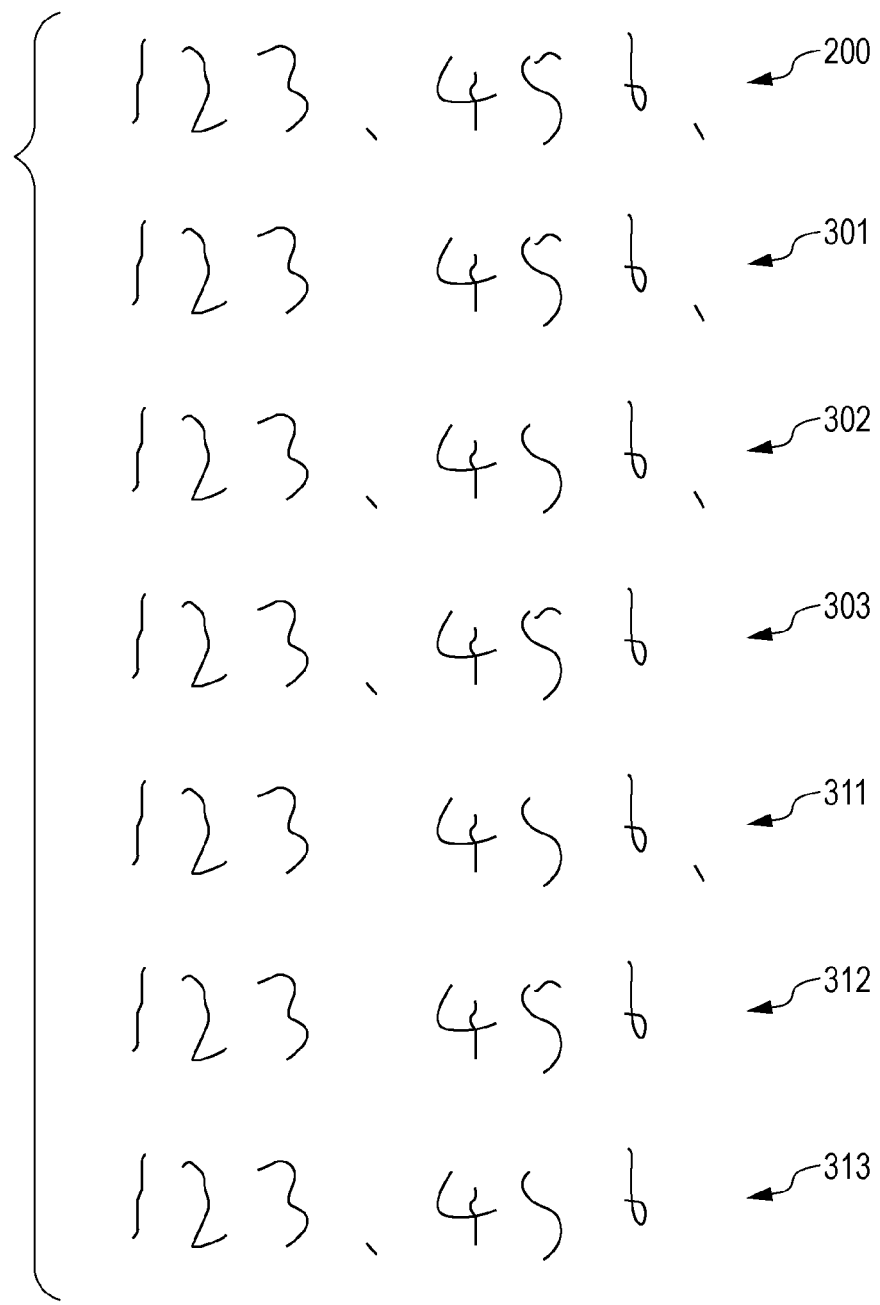

FIGS. 6A and 6B are diagrams illustrating examples, in each of which string-constituting-stroke group candidates are generated by determining a rule describing how to remove noise strokes. FIGS. 6A and 6B illustrate examples generated by determining a combination of string-constituting-stroke group candidates which are recognition result candidates. FIG. 6A illustrates an example obtained by removing zero to one noise stroke. FIG. 6B illustrates an example obtained by removing zero to two noise strokes. Thus, a combination of noise stroke candidates to be removed is determined, and multiple combinations of noise stroke candidates are generated.

Flow of Extremely-Small-Stroke Deletion Process—Character Recognition Process

After step S103 illustrated in FIG. 3, the character recognition processor 24 performs character recognition on the string-constituting-stroke group candidate, and obtains a recognition result string and a recognition score (step S104). It is determined whether all of the combinations are processed (step S105). If all of the combinations are not processed (NO in step S105), the process returns back to step S103 and the processes are repeatedly performed. If all of the combinations are processed (YES in step S105), the process proceeds to step S106.

FIG. 7 is a diagram illustrating recognition results and recognition scores (scores) obtained by the character recognition processor 24. A score is a value indicating a probability of recognition. A score is calculated by using the data stored in the character-type dictionary memory 31 and the context dictionary memory 32. In this example, the level of a recognition result is indicated from the neatness of a character or a probability from the viewpoint of context of the character, in the entire character string. Depending on the way of configuring the recognition system (recognition engine), the score is decreased from the viewpoint that, for example, a dot after the last numeral in context in which only numerals appear is not natural. In the example illustrated in FIG. 7, the recognition-target stroke group 200 and the string-constituting-stroke group candidates 301, 302, and 311 have a low score because, in a string containing only numerals, a dot is present after the last numeral. The string-constituting-stroke group candidates 302, 311, 313, and 321 have a low score because, due to removal of the second noise stroke candidate 202, the character form is broken and uncertainties, such as whether the character is "3" or "5", are increased.

Flow of Extremely-Small-Stroke Deletion Process—Selection of Most Likely Candidate After character recognition is performed on all of the combinations in steps S103 to S105, the most-likely-candidate output unit 25 selects candidates (string-constituting-stroke group candidates) whose scores are equal to or more than a predetermined threshold (step S106), and selects the candidate which has the highest number of strokes among the candidates whose scores are equal to or more than the threshold (step S107). That is, the most probable recognition result is selected from the multiple generated recognition results. Through these processes, a most likely candidate is selected, the result is output by the recognition result output unit 26 (step S108), and the process is ended. The threshold used in step S106 is a value depending on the recognition target or the recognition engine. In the example, candidates whose scores are equal to or more than 0.8 are selected. In the example illustrated in FIG. 7, the string-constitutingstroke group candidate 303 and the string-constituting-stroke group candidate 312 are selected.

Figure 8:
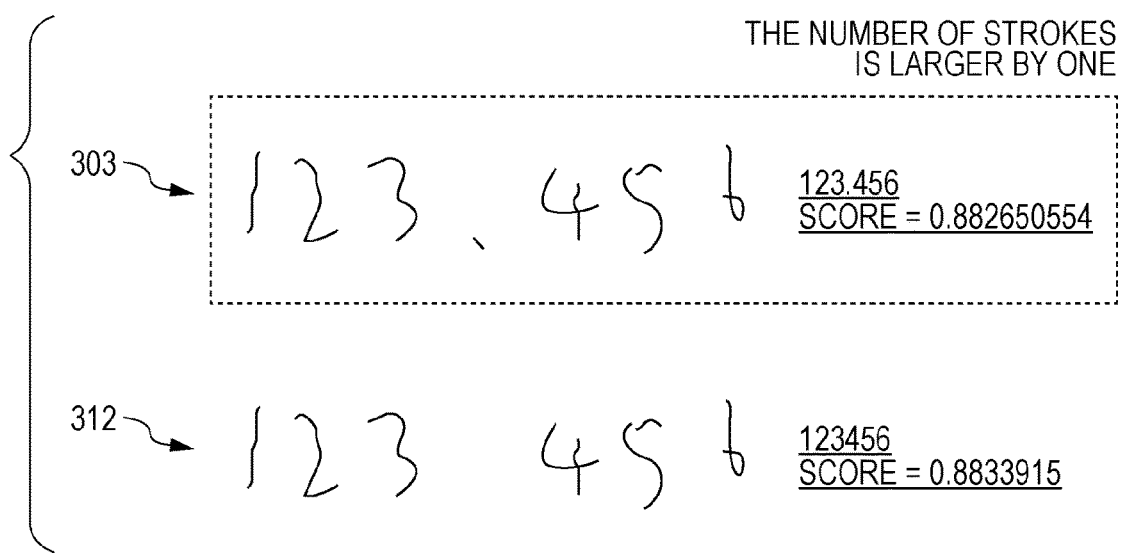
FIG. 8 is a diagram for describing a process in which a most likely candidate is selected and which is performed by a most-likely-candidate output unit.

FIG. 8 is a diagram for describing a process in which a most likely candidate is selected and which is performed by the most-likely-candidate output unit 25. In the example, the string-constituting-stroke group candidate 303 and the string-constituting-stroke group candidate 312, each of which has a score equal to or more than 0.8, are selected. The most-likely-candidate output unit 25 selects a candidate containing more strokes, from these candidates as the final result. In the example illustrated in FIG. 8, the number of strokes in the string-constituting-stroke group candidate 303 is larger than that in the string-constituting-stroke group candidate 312 by one. Therefore, the string-constituting-stroke group candidate 303 is determined to have a higher probability, and is selected as a most likely candidate.

In the process of selecting a most likely candidate, a recognition result candidate having the largest number of strokes is selected as a most likely candidate. This is because, when the number of strokes is large, there is often some meaning in that more strokes are included in the candidate. However, there is another recognition engine in which a score is decreased as a character to be recognized is larger. In this case, an exemplary embodiment may be employed in which a candidate having less strokes is selected as a most likely candidate. In either case, a most likely candidate is selected on the basis of strokes. As a viewpoint other than the number of strokes, a most likely candidate may be selected by focusing on the number of characters in the final stage. For example, a recognition result candidate having the largest number of characters may be selected as a most likely candidate.

As described in detail above, in the case where a string which is to be obtained as a recognition result is "123.456" in the recognition-target stroke group 200 illustrated in FIG. 4A and where such a string fails to be recognized due to an adverse effect of a noise stroke, the character recognition apparatus 10 according to the exemplary embodiment may deal with a challenge to remove such a noise stroke. As a solution for this challenge, the character recognition apparatus 10 detects noise stroke candidates on the basis of the size of a noise stroke and the like, and generates multiple string-constituting-stroke group candidates obtained by removing the noise stroke candidates. The character recognition apparatus 10 employs the most likely recognition result from the generated candidates as a correct result. Thus, without using an evaluation value for noise, accurate removal of only noise in a state in which noise and non-noise are present in a coexistent manner is achieved.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A character recognition apparatus comprising:
a processor configured to:
extract a plurality of strokes from a recognition target;
extract noise candidates from the plurality of strokes;
generate a plurality of recognition result candidates obtained by removing at least one of the noise candidates from the recognition target;
perform character recognition on the plurality of recognition result candidates and calculate recognition scores for each of the plurality of recognition result candidates; and
use the recognition scores to specify a most likely recognition result candidate from the plurality of recognition result candidates as a recognition result.

2. The character recognition apparatus according to claim 1,
wherein the processor is further configured to select a recognition result candidate whose recognition score is larger than a predetermined value from the plurality of recognition result candidates and specify the selected recognition result candidate as the recognition result.

3. The character recognition apparatus according to claim 2,
wherein the processor is further configured to specify a recognition result candidate having the largest number of strokes, from the plurality of recognition result candidates as the recognition result.

4. The character recognition apparatus according to claim 2,
wherein the processor is further configured to specify a recognition result candidate having the largest number of characters from the plurality of recognition result candidates as the recognition result.

5. The character recognition apparatus according to claim 1,
wherein the processor is further configured to specify a recognition result candidate having the largest number of strokes from the plurality of recognition result candidates as the recognition result.

6. The character recognition apparatus according to claim 1,
wherein the processor is further configured to specify a recognition result candidate having the largest number of characters from the plurality of recognition result candidates as the recognition result.

7. The character recognition apparatus according to claim 1, wherein the processor is configured to calculate the recognition score using a neatness of a character compared to a plurality of characters in each of the plurality of recognition result candidates.

8. The character recognition apparatus according to claim 1, wherein the processor is configured to specify, from among the plurality of recognition result candidates having the recognition score greater than a predetermined threshold, the most likely recognition result candidate as the recognition result candidate having a greatest number of character strokes.

9. A character recognition apparatus comprising:
a processor configured to:
extract a plurality of strokes from a recognition target;
extract noise candidates from the plurality of strokes;
generate a plurality of recognition result candidates obtained by removing at least one of the noise candidates from the recognition target; and
select recognition result candidates from the plurality of recognition result candidates, each of the selected recognition result candidates having a recognition score higher than a predetermined value, the recognition score indicating a probability of recognition, and specify a recognition result candidate having the largest number of strokes from the selected recognition result candidates as a recognition result.

10. The character recognition apparatus according to claim 9,
wherein the processor is further configured to determine a combination of the plurality of recognition result candidates.

11. A character recognition processing system comprising:
a character recognition apparatus; and
a user-writing-information acquiring device,
wherein the character recognition apparatus includes a processor configured to:
extract a plurality of strokes from a recognition target obtained from the user-writing-information acquiring device,
extract noise candidates from the plurality of strokes,
generate a plurality of recognition result candidates obtained by removing at least one of the noise candidates from the recognition target,
calculate recognition scores for each of the plurality of recognition result candidates
perform character recognition on the plurality of recognition result candidates and calculate recognition scores for each of the plurality of recognition result candidates,
use the recognition scores to specify a most likely recognition result candidate from the plurality of recognition result candidates as a recognition result, and
output the recognition result specified by the processor.

12. A non-transitory computer readable medium storing a program causing a computer to execute a process comprising:
extracting a plurality of strokes from a recognition target;
extracting noise candidates from the plurality of strokes;
generating a plurality of recognition result candidates obtained by removing at least one of the noise candidates from the recognition target;
performing character recognition on the plurality of recognition result candidates and calculating recognition scores for each of the plurality of recognition result conditions; and
using the recognition scores to specify a most likely recognition result candidate from the plurality of recognition result candidates as a recognition result.

* * * * *